United States Patent [19]

Billet

[11] 4,366,893

[45] Jan. 4, 1983

[54] TORSION DAMPING CENTER FOR THE DRIVEN DISC OF A FRICTION CLUTCH FOR A MOTOR VEHICLE

[75] Inventor: Rene Billet, Lamorlaye, France

[73] Assignee: Societe Anonyme Francaise du Ferodo, Paris, France

[21] Appl. No.: 162,648

[22] Filed: Jun. 24, 1980

[30] Foreign Application Priority Data

Jun. 25, 1979 [FR] France .................. 79 16229

[51] Int. Cl.³ .............................................. F16D 3/66
[52] U.S. Cl. .................................................. 192/106.2
[58] Field of Search ....................... 192/106.1, 106.2; 64/27 S, 27 C; 24/20 EE, 33 K, 33 M; 403/338, 335

[56] References Cited

U.S. PATENT DOCUMENTS 4,234,068 11/1980 Le Brise ........................ 192/106.2

FOREIGN PATENT DOCUMENTS 2362309 3/1978 France .

Primary Examiner—George H. Krizmanich
Attorney, Agent, or Firm—Charles E. Brown

[57] ABSTRACT

A torsion damping assembly is disclosed in which there are provided two coaxial parts mounted for limited relative angular displacement, one being a web and the other a pair of guide plates flanking the web. Spacer members interconnect the guide plates within their outer periphery and extend axially through the guide plates and are crimped therebeyond. A connecting bar attaches at least two such spacer members in a group. Preferably four such groups of three spacer members are provided, each connecting bar being bent or arched. The torsion damping assembly may comprise the torsion damping center of a drive disc of a friction clutch.

11 Claims, 5 Drawing Figures

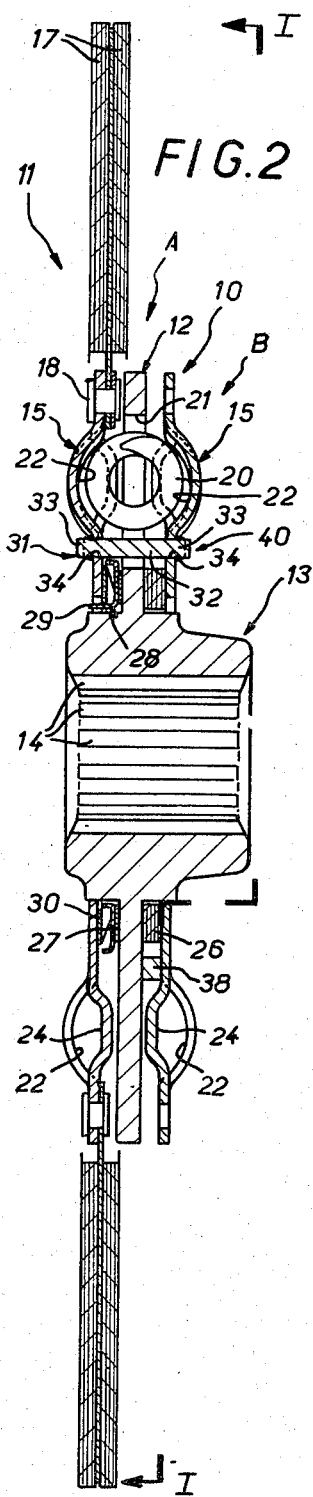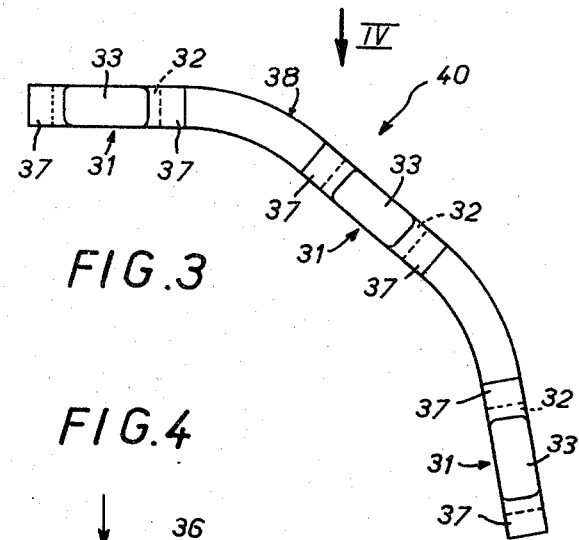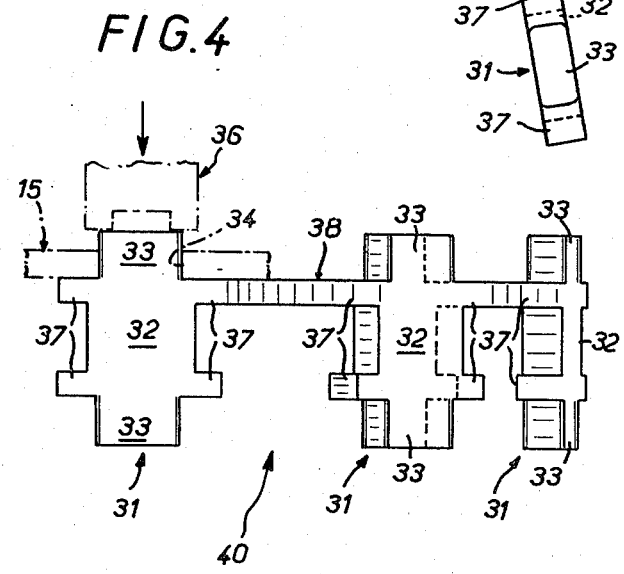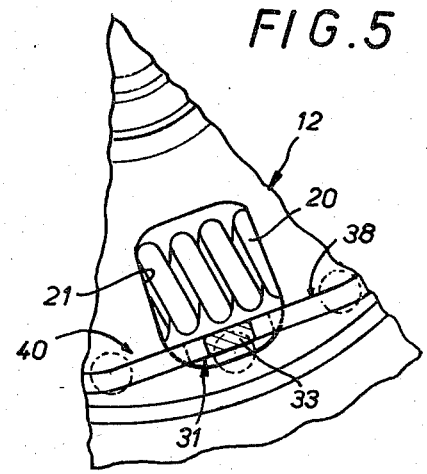

TORSION DAMPING CENTER FOR THE DRIVEN DISC OF A FRICTION CLUTCH FOR A MOTOR VEHICLE

The present invention relates generally to torsion damping centers for the driven disc of a friction clutch, particularly for an automotive vehicle.

Such torsion damping centers generally comprise two coaxial parts mounted for limited relative angular displacement against circumferentially acting resilient means. One of the parts comprises a web and the other part comprises two guide plates disposed on opposite sides of the web and parallel thereto. The annular guide plates are interconnected by spacer members distinct from the guide plates and parallel to the axis of the assembly. The ends of the spacer members extend through apertures in the guide plates and therebeyond are deformed, e.g., crimped, into contact with their associated guide plate.

The present invention relates particularly though not exclusively to the case where the spacer members are so-called flat spacer members which have a typically rectangular cross section with a tangentially elongated side and which therefore may be economically stamped from a blank in a press.

Such a torsion damping assembly may be used in the construction of a driven disc or clutch plate having a torsion damper center, in particular, for motor vehicles.

In this case one of the coaxial parts comprises a friction disc carrier member which is provided with friction linings along its periphery on each of its faces. The friction disc is thus adapted to be clamped between two elements fixed for rotation with a shaft, in actual practice the driving shaft, while the other of the coaxial parts is fixed to a hub which is adapted to be fixed for rotation with another shaft, in actual practice the driven shaft.

For example, the friction disc is fixed to one of the annular guide plates, the web then being fixed to the hub whereas the annular guide plates are mounted for relative angular rotation with respect to the hub. As a variant the friction disc may be fixed to the web whereby the web is mounted for relative rotation with respect to the hub while the annular guide plates are fixed to the hub.

In any event all or part of the torque which the driving shaft transmits to the driven shaft must be carried by the spacer members interconnecting one of the annular guide plates to the other.

Thereupon in actual operation each spacer member which is fitted in its associated annular guide plate with its ends crimped thereagainst is not merely subjected to a shearing force, but a circumferential couple which develops at the axial ends of the associated spacer member is combined with this shearing force. In practice notably when the torque transmitted is great the circumferential couple exerted on the spacer members is detrimental to good mechanical behavior of the same and therefore to satisfactory operation and acceptable service life of the assembly.

It is true that it has already been proposed notably in U.S. Pat. application Ser. No. 880,704 filed Feb. 23, 1978 to connect all the spacer members to a single annular member disposed at the outer periphery of one of the guide plates beyond the outer periphery of the web flanked by the guide plates.

Such an arrangement, however, is only suitable in actual practice for certain particular designs.

For other designs, for example that of the present invention, it is necessary that the spacer members employed be disposed inside the contour defined by the outer periphery of the guide plates in which case the spacer members must be separate or distinct since each spacer member must extend through an aperture in the web with sufficient clearance so as not to interfere with the angular displacement of the web relative to the annular guide plates which flank the same.

An object of the present invention is the provision of an arrangement which permits such spacer members to minimize the circumferential couple exerted at the axial ends of the spacer members.

According to the invention there is provided a torsion damping assembly of the type comprising two coaxial parts mounted for predetermined limited angular displacement relative to each other against the force of circumferentially action resilient means, one of the coaxial parts comprising a web and the other of the coaxial parts comprising two annular guide plates disposed parallel to and on opposite sides of the web, the annular guide plates being interconnected inside the contour defined by the outer periphery of the guide plates by spacer members which are distinct from the annular guide plates extending parallel to the axis of the assembly, the axial ends of the spacer members extending through their associated guide plates and deformed therebeyond, the torsion damping assembly being characterized by a connecting bar circumferentially attaching between the guide plates a group of at least two of the said spacer members.

According to the invention there is also provided a driven disc for a friction clutch of a motor vehicle having a torsion damping assembly defined above.

Preferably a plurality of connecting bars are provided, the plurality of connecting bars attaching circumferentially all of the spacer members in groups of at least two.

In any event the bridging defined by the connecting bar between circumferentially adjacent spacer members advantageously comprises in relation to the circumferential couple exerted at the axial ends of the spacer members a stabilizing effect which is capable of minimizing the effects of the circumferential couple exerted.

Moreover the forces the spacer members are subjected to are advantageously close to that due to the shearing force only, which contributes to the good mechanical behavior of the members, the fitting and crimping of the end of the spacer members being particularly well adapted to withstand such shearing forces.

These and other features and advantages of the invention will become apparent from the description which follows given by way of example with reference to the accompanying schematic drawings, in which:

FIG. 2 is a longitudinal section of the driven disc taken on broken line II—II in FIG. 1;

FIG. 3 is a plan view of a group of spacer members interconnected by a connecting bar of the torsion damping assembly;

FIG. 4 is an elevational view of the group of spacer members interconnected by a connecting bar taken in the direction of arrow IV in FIG. 3; and FIG. 5 repeats part of FIG. 1 and shows a modified embodiment according to the invention.

Figure 1:
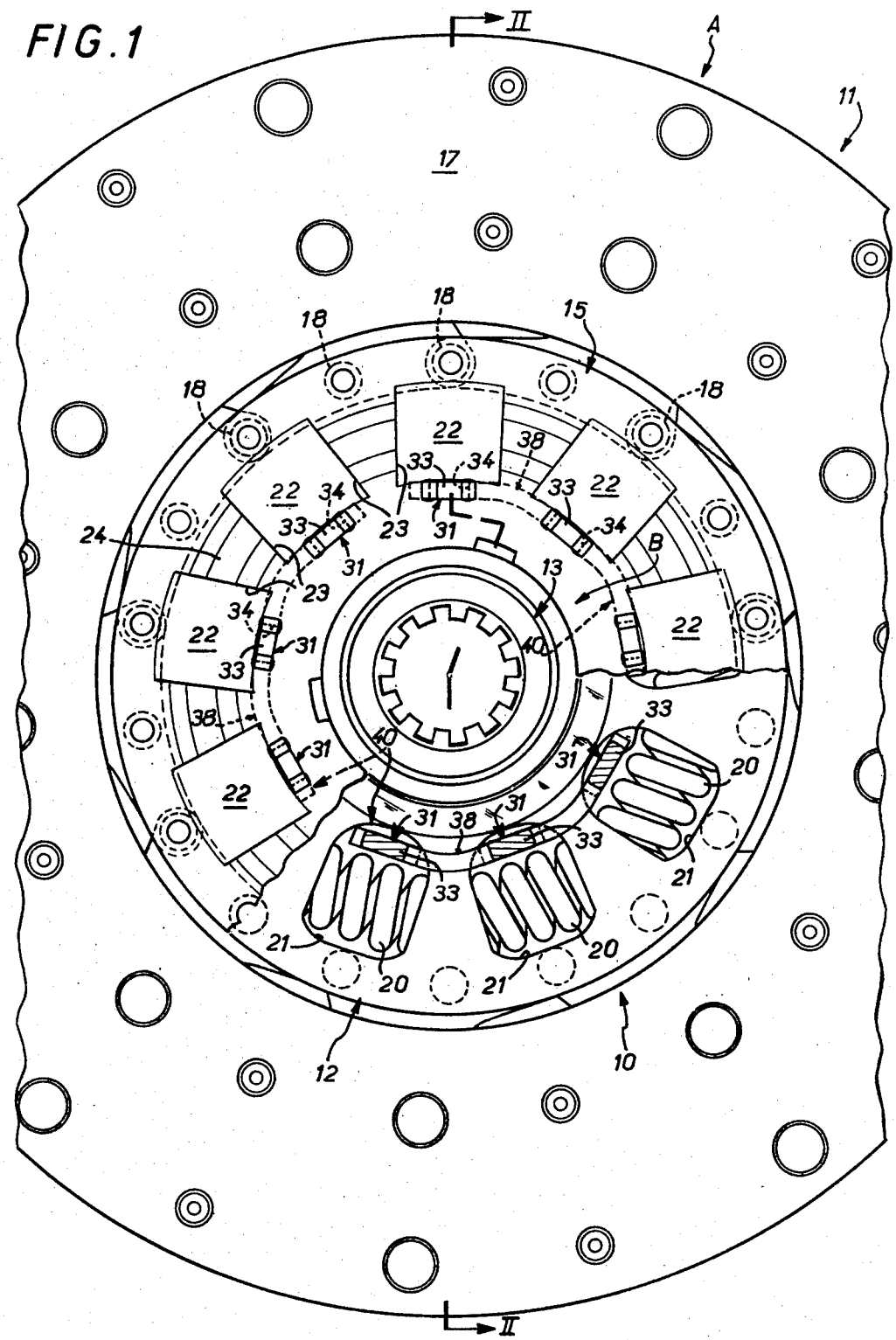
FIG. 1 is a fragmentary elevational view partly in section taken along the broken line I—I in FIG. 2 of a driven disc of a friction clutch having a torsion damping assembly embodying the present invention.

By way of example the accompanying drawings show and the following description describes the application of the present invention to the driven disc of 5 friction clutch having a torsion damping center.

The driven disc comprises a torsion damping assembly 10 and a friction disc 11.

The torsion damping assembly 10 itself comprises two coaxial parts A and B mounted for predetermined limited angular movement relative to each other against circumferentially acting resilient means.

Coaxial part A comprises an annular web 12. In the illustrated embodiment it also comprises a hub 13 to which the web is fixed, the web being disposed at the outer periphery of the hub 13, and axially intermediate its ends and formed in one piece therewith. The hub 13 is adapted to be fixed for rotation with a first shaft, not illustrated, in actual practice the driven shaft by means of, for example, splines 14 as shown.

Part B comprises two annular guide plates or washers which are respectively disposed on opposite sides of the web 12 parallel thereto. The guide plates are freely rotatably mounted in relation to the hub 13 they annularly surround.

The friction disc 11 which carries friction facings 17 at its outer periphery and on each of its faces and is thereby adapted to be clamped between two elements, a pressure plate and a reaction plate or flywheel, fixed for rotation with a second shaft, in actual practice the driving shaft. The friction disc 10 is attached to one of the annular guide plates 15 by means of rivets 18 as illustrated.

Typically the circumferentially acting resilient means interposed between coaxial parts A and B described above comprise coil springs 20, nine in number in the ilustrated embodiment, arranged tangentially in the housings formed in part by windows 21 in the web 12 and in part by dished portions 21 formed by stamping the guide plates 15.

In the illustrated embodiment the dished portions 22 are circumferentially limited by radial slits 23 in their associated guide plates 15, between consecutive dished portions there are stamped in the guide plates 15 dished portions 24 in the opposite direction to the recess 22. The edges of the recesses 24 define circumferential bearing surfaces for coils springs 20.

Torsion damping means are provided betwen coaxial parts A and B in the illustrated embodiment comprising on one side of the web 12 a friction washer 26 between the web 12 and the annular guide plate 15 and adjacent to the hub 13, and on the other side of the web 12 a friction washer 27 in contact with the web 12 and fixed for rotation with a support washer 28 fixed for rotation by axial tabs 29 with the corresponding guide plate 15.

The friction washers 26 and 27 are together subjected to axially acting resilient means formed by a wavy or corrugated washer 30 of the Onduflex type in the present embodiment, inserted between the support washer 28 and the friction washer 27, on the one hand, and the corresponding guide plate 15, on the other hand.

The annular guide plates 15 are connected for rotation with each other inside the contour defined by their outer peripheries by means of spacer members 31 distinct from the guide plates 15 and extending parallel to the axis of the assembly.

In actual practice in the illustrated embodiment the spacer members are so-called flat spacer members, i.e., spacer members formed by cutting out a blank and having a substantially rectangular cross section. In the illustrated embodiment between the guide plates 15 the cross section is tangentially elongated along a circle coaxial to the assembly.

Each of the spacer members 31 comprises a shank 32 and at each axial end thereof a head 33 which is adapted to extend through a complementary aperture 34 in the associated guide plate 15. Beyond the guide plate 15 the corresponding head 33 of a spacer member 32 is deformed by crimping into contact with the guide plate for fixing them together.

In the illustrated embodiment and as known per se, notably as taught by French printed patent application No. 2,361,575, only the circumferential ends of the heads 33 are deformed as illustrated in phantom lines in FIG. 4 by means of a bifurcated tool 36.

In the illustrated embodiment each of the spacer members 31 further comprises between the guide plates 15 and in contact with each of them two arms 37 extending in circumferentially opposed directions and contributing to bearing the corresponding guide washer 15 during the aforesaid crimping step.

There is sufficient clearance between each spacer member 31 and the apertures extending axially through the web 12 so as not to interfere with the relative angular displacement of the guide plates 15 with respect to the web 12.

To the illustrated embodiment the spacer members 31 are for this reason received in the windows 21 of the web 12 for accommodating the springs 20, their maximum circumferential extent measured at the ends of their arms 37 being less than that of the windows 21.

Further in FIGS. 1–4 the space members 31 are disposed in the vicinity of the inner periphery of the web 12, between the springs 20 and the hub 13.

According to the invention between the guide plates 15 some of the spacer members 31 are circumferentially attached in groups of at least two by a connecting bar 38.

In actual practice as shown in the illustrated embodiment the spacer members 31 are all arranged in groups 40 of thres spacer members, all the spacer members of a given group being attached together by a connecting bar 38. One such group 40 is shown on its own in FIGS. 3 and 4.

The connecting bars 38 of the groups 40 are arched or bent so that they generally embrace an arc of a circle of substantially 90° and open at the center.

Whatever the number of groups 40 of spacer members 31 employed and whatever the number of spacer members 31 in each such group there results from the grouping of the spacer members 31 that each of the spacer members 31 is circumferentially attached by a connecting bar 38 to at least another spacer member 31.

In the illustrated embodiment such a connecting bar 38 forms the continuation of arms 37 of each of the two or more space members 31 that are interconnected and therefore the connecting bar 38 like the arms 37 is therefore in contact with the corresponding guide plates 15.

Obviously, on account of the spacer members 31 extending through the web 12 they can only have a connecting bar on one side of the web.

In any event such a connecting bar is advantageously capable of minimizing in operation the aforesaid circumferential couple exerted at the axial ends of the spacer members 31 by reason of the rotational torque they must transmit from one of the guide plates 15 to the other.

According to the modified embodiment of FIG. 5 the spacer members 31 are again located through the windows 21 in the web 12 but they extend in the vicinity of the outer periphery thereof, beyond the springs 30 in relation to the hub 13. In fact the spacer members may be located at any radial position of the assembly.

The present invention is moreover not limited to the illustrated embodiments but encompasses all modifications, alternatives and expedient which may be incorporated without departing from the scope of the invention, particularly as regards the number of groups of spacer members and the number of spacer members in each of the groups. In the limit case a single group of spacer members may be connected in a ring which may be of closed configuration or not.

Further, although the arrangement described whereby the connecting bar 38 interconnecting two or more spacer members is in contact with the corresponding guide plate 15 contributes to reducing the aforesaid circumferential couple exerted on the spacer members in operation, such connecting bars may for example, on the contrary, be backed off along at least part of their length particularly when structural requirements so dictate.

Finally in the application of the torsion damping assembly to a torsion damping center of a driven disc of a friction clutch the friction disc of the driven disc is not necessarily fixed to the guide plate. As a variant the friction disc may be fixed to the web which is flanked by the guide plates. The web then is freely rotatable in relation to the hub which it surrounds while the guide plates are fixed thereto.

What is claimed is:

1. A torsion damping assembly of the type comprising two coaxial parts rotatably mounted for predetermined limited angular displacement relative to each other against the force of circumferentially acting resilient means, one of the coaxial parts comprising a web and the other of the coaxial parts comprising two annular guide plates disposed parallel to and on opposite sides of said web, spacer members interconnecting said guide plates inside the contour defined by the outer periphery of said guide plates, said spacer members being distinct from said annular guide plates and extending parallel to the axis of the assembly, each axial end of said spacer members extending through its associated guide plate and deformed therebeyond, and a connecting bar circumferentially attaching between said guide plates a group of at least two of said spacer members.

2. The torsion damping assembly according to claim 1, wherein said group of spacer members consists of three spacer members.

3. The torsion damping assembly according to claim 1 or 2, wherein a plurality of said connecting bars are provided, said plurality of connecting bars attaching all of said spacer members in said groups of at least two.

4. The torsion damping assembly according to claim 1 or 2, wherein said spacer members each comprise at least two arms in contact with an associated one of said guide plate, one of said arms extending in a first circumferential direction and the other of said arms extending in the opposed circumferential direction, said connecting bar being the continuation of said arms of said at least two spacer members whereby said connecting bar is also in contact with said one guide plate.

5. The torsion damping assembly according to claim 3, wherein said spacer members each comprise at least two arms in contact with an associated one of said guide plates, one of said arms extending in a first circumferential direction and the other of said arms extending in the opposed circumferential direction, each of said connectingbars being the continuation of said one arm on one of its associated spacer members and said other arm of another of its associated spacer members whereby said connecting bars are also in contact with said one guide plate.

6. The torsion damping assembly according to claim 1, wherein the axial dimension of said connecting bar is less than the distance between the guide plates.

7. A torsion damping assembly of the type comprising two coaxial parts rotatably mounted for predetermined limited angular displacement relative to each other against the force of circumferentially acting resilient means, one of the coaxial parts comprising a web and the other of the coaxial parts comprising two annular guide plates disposed parallel to and on opposite sides of said web, spacer members interconnecting said guide plates inside the contour defined by the outer periphery of said guide plates, said spacer members being distinct from said annular guide plates and extending parallel to the axis of the assembly, axial ends of said spacer members extending through their associated guide plates and deformed therebeyond, and a connecting bar circumferentially attaching between said guide plates a group of at least two of said spacer members, said connecting bar being disposed axially between a single one of said guide plates and said web.

8. The torsion damping assembly according to claim 1 or 7, wherein said connecting bar has a generally arcuate configuration.

9. The torsion damping assembly according to claim 8, wherein the arcuate extent of said connecting bar is of the order of 80°–120°.

10. The torsion damping assembly according to claim 1 or 7, wherein said web is provided with a plurality of separate apertures each for accommodating a single one of said spacer members.

11. A driven disc of a friction clutch having a torsion damping center comprising two coaxial parts rotatably mounted for predetermined limited angular displacement relative to each other against the force of circumferentially acting resilient means, one of said coaxial parts comprising two annular guide plates disposed parallel to and on opposite sides of said web, a first of said coaxial parts being fixed to a hub and a second of said coaxial parts carrying a friction disc, spacer members interconnecting said guide plates inside, a contour defined by the outer periphery of said guide plates, said spacer members being distinct from said annular guide plates and extending parallel to the axis of said driven disc, each axial end of said spacer members extending through its associated guide plates and deformed therebeyond, and a connecting bar circumferentially attaching between said guide plates a group of at least two of said spacer members.

* * * * *